US007269135B2

(12) United States Patent
Frick et al.

(10) Patent No.: US 7,269,135 B2
(45) Date of Patent: Sep. 11, 2007

(54) METHODS AND SYSTEMS FOR PROVIDING REDUNDANT CONNECTIVITY ACROSS A NETWORK USING A TUNNELING PROTOCOL

(75) Inventors: John Kevin Frick, Raleigh, NC (US); Cedell A. Alexander, Jr., Durham, NC (US); Olen Lee Stokes, Jr., Morrisville, NC (US); Charles Frederick Burton, III, Cary, NC (US); Donald Bruce Grosser, Jr., Apex, NC (US)

(73) Assignee: Extreme Networks, Inc., Santa Clara, CA (US)

( * ) Notice: Subject to any disclaimer, the term of this patent is extended or adjusted under 35 U.S.C. 154(b) by 1113 days.

(21) Appl. No.: 10/115,705

(22) Filed: Apr. 4, 2002

(65) Prior Publication Data

US 2003/0189898 A1  Oct. 9, 2003

(51) Int. Cl.
  *H04L 12/56* (2006.01)
(52) U.S. Cl. .................... 370/228; 370/355; 370/395.5
(58) Field of Classification Search ................ 370/219, 370/220, 226
  See application file for complete search history.

(56) References Cited

U.S. PATENT DOCUMENTS 6,222,820 B1 * 4/2001 Hamami ..................... 370/218
6,891,793 B1 * 5/2005 Suzuki et al. ............... 370/217
6,895,441 B1 * 5/2005 Shabtay et al. ............. 709/238
6,954,790 B2 * 10/2005 Forslow ...................... 709/227
7,082,140 B1 * 7/2006 Hass ........................... 370/466
2002/0004843 A1 * 1/2002 Andersson et al. ......... 709/238
2002/0063916 A1 * 5/2002 Chiu et al. .................. 359/110
2002/0067693 A1 * 6/2002 Kodialam et al. .......... 370/216
2002/0071389 A1 * 6/2002 Seo ............................. 370/232
2002/0101868 A1 * 8/2002 Clear et al. ................. 370/389
2004/0114595 A1 * 6/2004 Doukai ....................... 370/389
2004/0202171 A1 * 10/2004 Hama ....................... 370/395.1

* cited by examiner

*Primary Examiner*—Chi Pham
*Assistant Examiner*—Kevin Mew
(74) *Attorney, Agent, or Firm*—Jenkins, Wilson, Taylor & Hunt, P.A.

(57) ABSTRACT

Methods and systems for providing redundant network connectivity across a network using a tunneling protocol by dynamically moving a TLS tunnel between master and slave switches based on relative connectivity provided by the switches are disclosed. A standby routing protocol executes on the master and slave switches to monitor the relative connectivity. In response to detecting that the relative connectivity of the slave switch exceeds that of the master switch, the standby routing protocol reverses the roles of the master and slave switches, thus moving the TLS tunnel to the new master switch.

33 Claims, 7 Drawing Sheets

METHODS AND SYSTEMS FOR PROVIDING REDUNDANT CONNECTIVITY ACROSS A NETWORK USING A TUNNELING PROTOCOL

TECHNICAL FIELD

The present invention relates to methods and systems for providing redundant connectivity across a network. More particularly, the present invention relates to methods and systems for providing redundant connectivity across a network using a tunneling protocol.

BACKGROUND ART

In the computer networking field, a tunnel generally refers to a logical connection in which lower layer protocol data units or packets are transported across a network in higher layer packets. The packets being transported through the tunnel are not used in making routing decisions across the network. Only the encapsulating packet of the tunneling protocol is used to make routing decisions. As a result, the packets being tunneled are transmitted transparently across the underlying network. Such transparent communication enables logical networks to be set up across diverse geographic areas.

One example of a protocol that can be used to establish a tunnel across an IP network is multi-protocol label switching or MPLS. MPLS is a protocol defined by the Internet Engineering Task Force to transport packets across a network using label switching. A label is a fixed-length identifier included in a shim header that may be located between layer 2 and 3 headers in a packet. MPLS routers, referred to as label switching routers or LSRs, make routing decisions based on the labels, rather than network layer addresses. Labels are assigned to packets by label edge routers when packets enter the MPLS network. Once a label is assigned to a packet, routing in the MPLS network is based only on the MPLS label. Each LSR receives a packet, makes a forwarding decision based on the label, and replaces the label in the outgoing packet with a new label. The path that a packet follows through the MPLS network is referred to as a label switched path or LSP. Label switched paths may be set up in advance by MPLS routers using a protocol referred to as the label distribution protocol or LDP.

Figure 1:
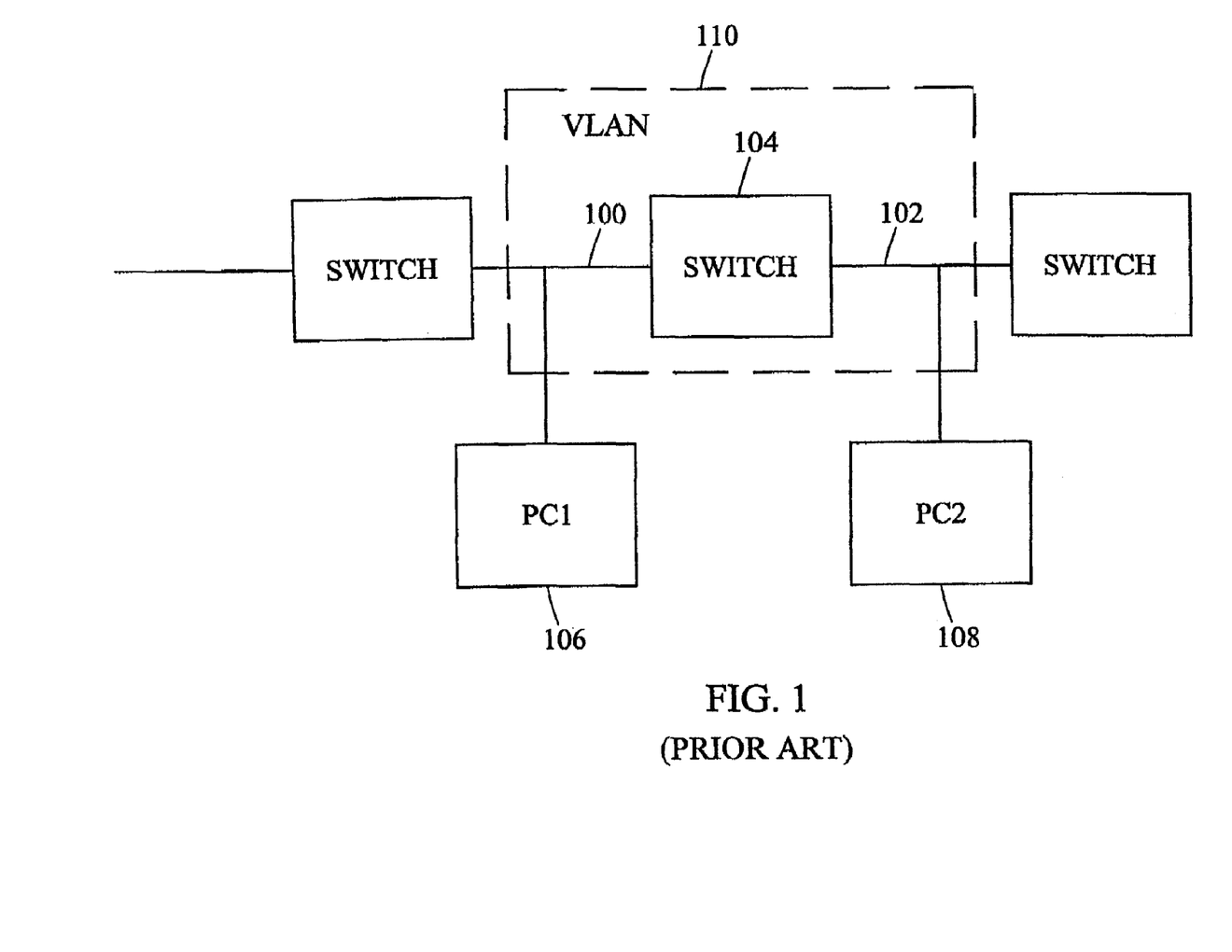
FIG. 1 is a network diagram of a conventional VLAN.

Label switched paths may be used to set up tunnels that interconnect geographically diverse networks. One type of logical network that may be interconnected using tunnels is a virtual local area network or VLAN. FIG. 1 illustrates the VLAN concept. In FIG. 1, local area networks 100 and 102 may be physical local area networks, such as Ethernets. A switch 104 interconnects local area networks 100 and 102. PCs 106 and 108 are located on different physical local area networks. However, PC 106 and PC 108 may be on the same logical network or VLAN using a VLAN identifier located in the layer 2 information in a packet header. Thus, box 110 represents a virtual local area network that spans two physical local area networks.

Virtual local area networks allow logical networks to be established within an organization for groups of individuals whose terminals are not on the same physical network. For example, the marketing department in a company may span several floors or buildings, each with its own physical network. In order to facilitate seamless communications between these individuals without requiring a restructuring of the organization's physical network, a VLAN may be established by assigning a VLAN identifier to the marketing department. The switches between the physical networks include VLAN forwarding tables used to forward packets to the proper physical LAN. Thus, VLANs facilitate seamless communication between different physical networks at the local level.

In large organizations, groups within the organization may be located in geographically diverse sites. Accordingly, it may be desirable to seamlessly interconnect logical networks or VLANs in the geographically diverse sites using tunnels. Once a tunnel has been established, two or more geographically diverse networks can communicate transparently and securely with each other over the tunnel.

Figure 2:
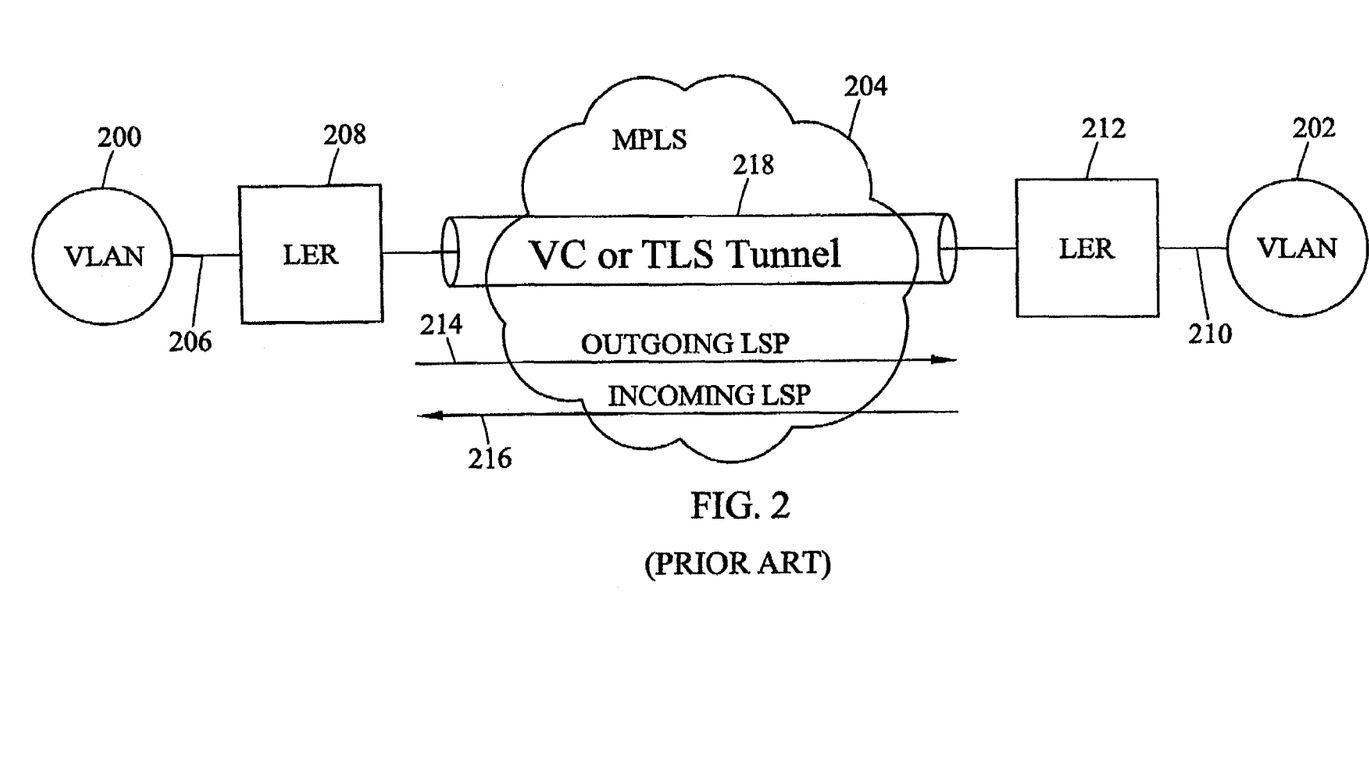
FIG. 2 is a network diagram of tunneling between remote VLANs utilizing a single VC or TLS tunnel.

FIG. 2 illustrates conventional VLAN interconnection using tunnels. In FIG. 2, the first VLAN 200 communicates with a geographically diverse VLAN 202 via MPLS network 204. VLAN 200 has a single logical connection 206 with its local label edge router 208. Connection 206 may be a VLAN connection. Similarly, VLAN 202 has a single logical connection with its local label edge router 212. Connection 210 may also be a VLAN connection.

In order to communicate VLAN traffic over MPLS network 204, label edge routers 208 and 212 may establish unidirectional label switched paths 214 and 216 across MPLS network 204 and a bi-directional tunnel 218 over LSPs 214 and 216. One specific example of a tunneling protocol suitable for use as bi-directional tunnel 218 is described in IETF Internet Drafts Draft-Martini-12-circuit-encap-MPLS-04.text, "Encapsulation Methods for Transport of Layer 2 Frames Over IP and MPLS Networks," November 2001, and Draft-Martini-12-circuit-trans-MPLS-08.text, "Transport of Layer 2 Frames Over MPLS," November 2001, the disclosures of each of which are incorporated herein by reference in their entirety. Bi-directional tunnels used to carry layer 2 traffic over MPLS networks are referred to as transparent LAN services (TLS) or virtual circuit (VC) tunnels.

While the above-referenced IETF Internet Draft documents describe tunneling protocols for sending layer 2 frames over an MPLS network, neither specifies a method by which redundant connectivity can be provided across the MPLS network. If a tunnel between label edge routers fails, e.g., due to a network connectivity or system failure, the standards to not provide any mechanism for detecting this failure or establishing a backup tunnel. Accordingly, there exists a long-felt need for methods and systems for providing redundant connectivity across a network using a tunneling protocol.

DISCLOSURE OF THE INVENTION

In light of the above-described shortcomings of tunneling protocols, the present invention includes a method for detecting tunnel failure and establishing a backup tunnel using redundant label edge routers to provide redundant connectivity across a network, such as an MPLS network. According to one aspect, the present invention provides redundant connectivity across a network using a tunneling protocol. As used herein, the term "tunneling protocol" refers to any protocol that may be used to carry packets across a network using tunnels. Examples of tunneling protocols suitable for use with the present invention include MPLS, VC or TLS over MPLS, generic route encapsulation (GRE), and IP-sec.

A method for providing redundant connectivity across a network using a tunneling protocol includes configuring pairs of switches at each endpoint of a wide area network to provide redundant connections between the wide area network and a local area network located at each endpoint. One switch in each pair is initially configured to be in a master state, and the other switch in each pair is configured to be in a slave state. The master switch in each pair advertises a movable IP address to switches in the wide area network to establish LSPs and a bi-directional VC tunnel over the LSPs between the master switches. The slave switches do not advertise the movable IP address. However, the slave switches monitor the label advertisements by the master switch in the other pair and each slave switch establishes an outgoing LSP to the master switch in the other pair.

The master and slave switches at each endpoint exchange relative connectivity information using a standby routing protocol. In response to detecting that the connectivity between the master switch in one pair falls below that of the slave switch in the same pair, the master switch withdraws the IP address and any labels associated with the IP address. The slave switch transitions to master state and begins to advertise a route to the IP address and a label for the IP address. An incoming LSP and a bi-directional VC tunnel are then established between the master switch at the other endpoint and the new master switch that advertised the IP address. Traffic from the local area network can then proceed over the tunnel between the newly established master switch and the master switch at the other endpoint.

The present invention is particularly well-suited to provide redundant connectivity between remote VLANs. As such, switches according to the present invention preferably include VLAN capabilities.

Because the present invention monitors relative connectivity between switches and moves the IP address of a tunnel endpoint between switches based on the relative connectivity, the likelihood of a traffic or service interruption between geographically diverse local area networks is reduced.

Accordingly, it is an object of the invention to provide methods and systems for providing redundant connectivity over a network using a tunneling protocol.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the present invention will now be explained with reference to the accompanying drawings of which.

DETAILED DESCRIPTION OF THE INVENTION

Figure 3:
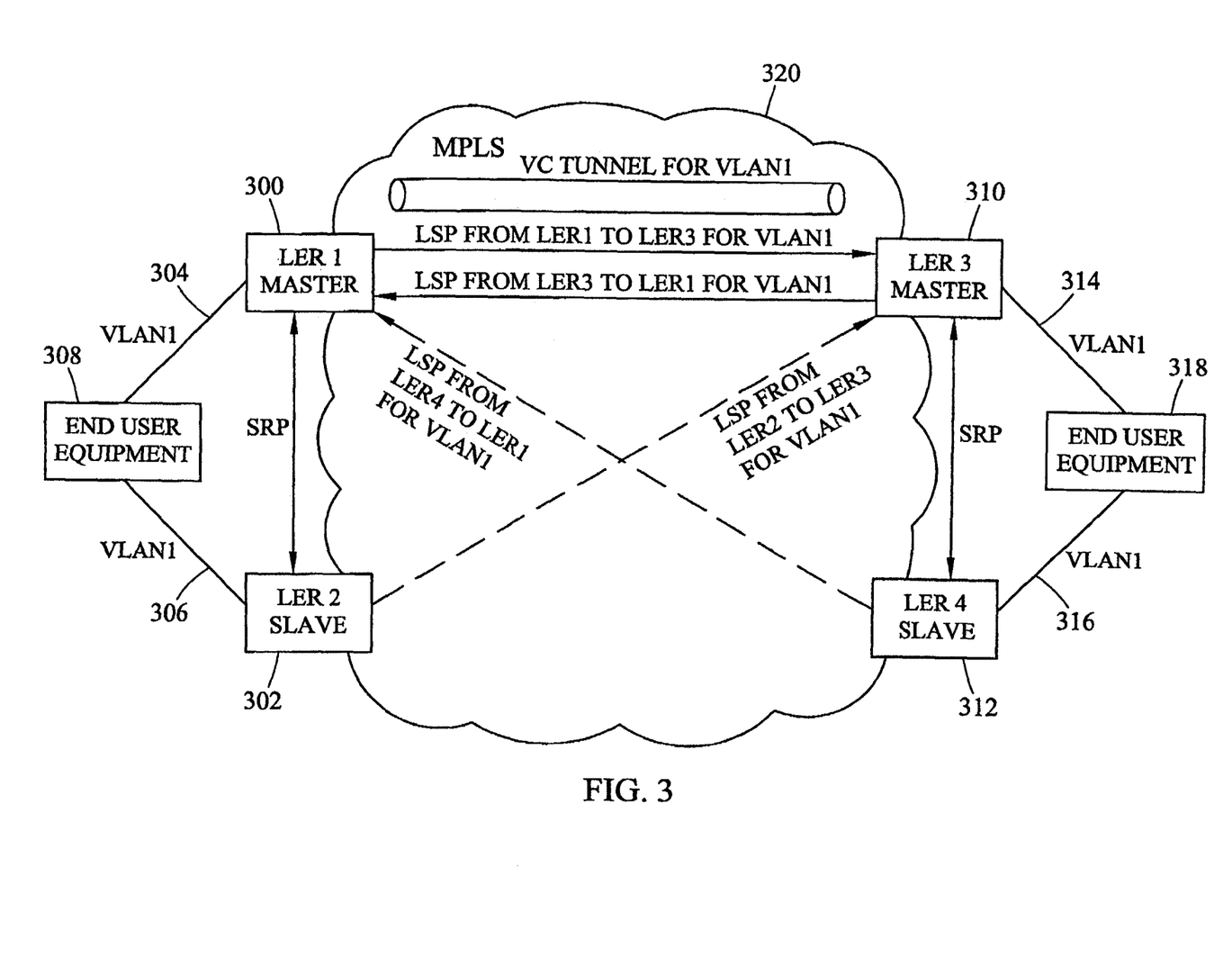
FIG. 3 is a network diagram of a system for providing redundant connectivity across a network using a tunneling protocol according to an embodiment of the present invention.

FIG. 3 illustrates a system for providing redundant connectivity across a network using a tunneling protocol according to an embodiment of the present invention. In FIG. 3, switches are provided at each local network endpoint and redundant logical connections are provided between local network equipment and the switches. For example, in FIG. 3, switches 300 and 302 include redundant VLAN connections 304 and 306 to end user equipment 308. Similarly, switches 310 and 312 include redundant VLAN connections 314 and 316 to end user equipment 318. Switches 300, 302, 310, and 312 may each include Ethernet, MPLS, VLAN, and IP routing capabilities. With regard to MPLS functionality, because switches 300, 302, 310, and 312 are located at the edge of a network, these switches preferably include label edge router functionality. Exemplary commercially available hardware platforms for use as switches 300, 302, 310, and 312 include the BlackDiamond™ 6800 switch with one or more MPLS modules, available from Extreme Networks, Inc., of Santa Clara, Calif. A description of exemplary hardware and software of the BlackDiamond™ switch suitable for use with embodiments of the present invention will be described in detail below.

In the example illustrated in FIG. 3, end user equipment 308 on VLAN1 may desire to communicate with end user equipment 318 on VLAN1. In order to establish such communication, according to the present invention, switch 300 is initially configured as a master and switch 302 is initially configured as a slave. Similarly, switch 310 is initially configured as a master and switch 312 is initially configured as a slave. As used herein, the terms "master" and "slave" refer to states of the switch with regard to communicating across MPLS network 320. In master state, a switch establishes ingress and egress LSPs and a TLS or VC tunnel with a remote master switch and communicates VLAN traffic over the tunnel. In slave state, a switch establishes a redundant outgoing LSP for a VLAN but no incoming LSP or TLS tunnel. The redundant outbound LSP is not used for VLAN communications until the slave switch transitions to the master state.

According to an important aspect of the invention, a switch transitions dynamically between master and slave states based on relative connectivity to either the end user equipment or MPLS network 320. For example, switch 300 may initially be in the master state and switch 302 may initially be in slave state for VLAN1. On the side of user equipment 308, switch 300 may include a predetermined number of physical Ethernet interfaces that map to VLAN1. Similarly, switch 302 may also include a predetermined number of Ethernet interfaces that map to VLAN1. Table 1 shown below illustrates an example of a VLAN Ethernet connectivity table that may be used at each of switches 300 and 302 to monitor their local Ethernet connectivity interfaces to each VLAN.

TABLE 1

VLAN to Ethernet Interface Mappings

| VLAN ID | Ethernet Interfaces | Status |
|---|---|---|
| VLAN1 | eth0 | Up |
|  | eth1 | Up |
| VLAN4 | eth2 | Up |
|  | eth3 | Up |
| VLAN5 | eth0 | Up |
|  | eth3 | Up |

In Table 1, each VLAN identifier is associated with multiple Ethernet interfaces. Since VLANs are logical networks, some VLANs may share Ethernet interfaces. These Ethernet interfaces are one measure of connectivity provided by each of switches 300 and 302 and the MPLS network.

Switches 300 and 302 may communicate connectivity information to each other via any suitable communication method. For example, switches 300 and 302 may communicate the connectivity information to each other via messages sent over a dedicated layer 2 connection between switches 300 and 302. In another example, switches 300 and 302 may exchange connectivity information via a user network. If a user network is used to exchange relative connectivity information, connectivity information exchange messages may be distinguished from user messages by establishing a separate VLAN between master and slave switches 300 and 302 via the user network.

Switches 300 and 302 continuously evaluate the connectivity information to make decisions as to which should be the master and which should be the slave. For example, if the number of available Ethernet interfaces for a particular VLAN on master switch 300 falls below the number of active interfaces for the VLAN available via slave switch 302, master switch 300 may transition to slave state and slave switch 302 may transition to master state.

Another example of a connectivity measurement that may be used to determine which switch functions as the master is relative connectivity to the MPLS network. For example, each switch 300 and 302 may maintain a table of IP address tracking data containing remote IP addresses to track on a perVLAN basis. Table 2 shown below is an example of IP address tracking data that may be maintained by switches 300 and 302 according to an embodiment of the present invention.

TABLE 2

IP Address Tracking Data

| VLAN ID | IP Address to Track | Label for outgoing LSP |
|---|---|---|
| VLAN1 | 10.10.221 | 17 |
|  | 10.30.221 | 55 |
| VLAN4 | 10.40.221 | 15 |
|  | 10.50.221 | 13 |
| VLAN5 | 10.70.221 | 7 |

In Table 2, each local VLAN is represented by a VLAN ID. Each VLAN ID has one or more remote IP addresses to track. If the switch has connectivity to the remote IP address via the MPLS network, a label will exist in the column labeled "Label for Outgoing LSP." If connectivity between the VLAN and the remote IP address does not exist, the entry in column 3 of Table 2 will not have a label. The absence of a label may be caused by failure of a link or of a switch in the MPLS network connecting either master switch 300 or slave switch 302 and the remote endpoint IP address.

Switches 300 and 302 may use the connectivity information in Table 1, the connectivity information illustrated in Table 2, or the connectivity information in both Tables 1 and 2 to make the relative connectivity determination. In the event that the connectivity of slave switch 302 becomes better than that of master switch 300 for a particular VLAN, master switch 300 preferably switches to slave mode, and slave switch 302 switches to master mode. This action causes an incoming label switched path and a bi-directional VC tunnel to be established between master switch 310 and new master switch 302. New master switch 302 then sends data to and receives data from label edge router 310 via the newly established tunnel.

According to an important aspect of the invention, master and slave switches are configured to dynamically move an IP address between each other based on relative connectivity. Traditionally, IP addresses are associated with fixed network interfaces. According to the present invention, a movable IP address resides with the label edge router that is configured in master state and moves to the other label edge router when that label edge router becomes the new master. Movement of the IP address will be discussed in further detail below.

Figure 4:
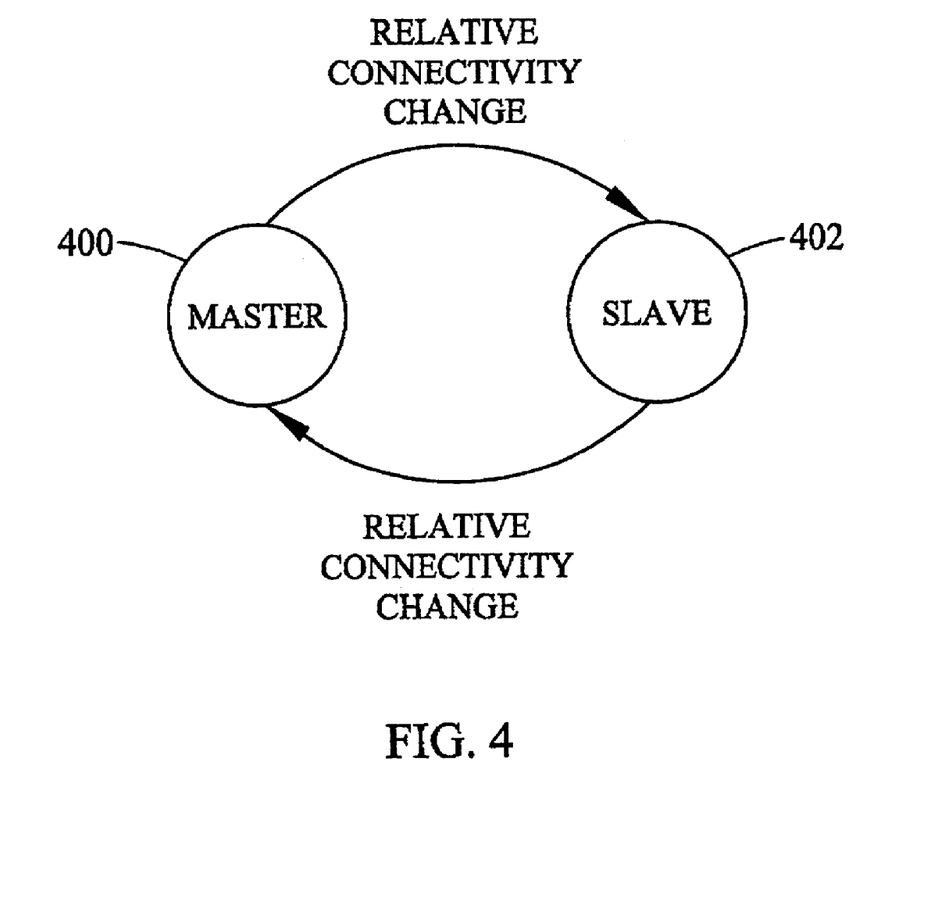
FIG. 4 is a state diagram illustrating exemplary states that may be implemented in a switch for providing redundant connectivity across a network using a tunneling protocol according to an embodiment of the present invention.

FIG. 4 is a state diagram illustrating exemplary states of a tunnel endpoint switch according to an embodiment of the present invention. In FIG. 4, the state diagram includes a master state 400 and a slave state 402. In master state 400, a tunnel endpoint switch advertises a route for the IP address for a particular VLAN, a label for an incoming LSP, and a label for a VC tunnel to MPLS label switched routers in MPLS network 320. The IP route advertisement may be performed using any suitable routing protocol, such as Open Shortest Path First (OSPF). The MPLS label advertisements may be performed using any suitable label distribution protocol, such as LDP. In master state 400, outgoing and incoming LSPs are established between the ingress master switch associated with the source VLAN and the egress master switch associated with the destination VLAN. A bi-directional layer 2 tunnel may then be set up between the master switches over the incoming and outgoing LSPs. An exemplary protocol suitable for establishing a bi-directional layer 2 tunnel over MPLS LSPs is targeted LDP, as described in IETF RFC 3036: "Label Distribution Protocol," January 2001, the disclosure of which is incorporated herein by reference in its entirety. According to the LDP specification, a label switch router may send a targeted hello message to a specific address rather than to the "all routers" group multicast address in order to establish a label switched path with one specific router. According to the present invention, master switches preferably exchange targeted hello messages in order to establish the bi-directional layer 2 tunnel. Once the bi-directional layer 2 tunnel is established, the master switches exchange layer 2 traffic, such as VLAN traffic, over the tunnel.

In slave state, a tunnel endpoint switch establishes outgoing label switched paths with the master switch associated with the other VLAN endpoint but does not forward traffic received from its local VLAN over the outgoing label switched path. A redundant outgoing label switched path may be formed by listening to label advertisements from the master switch at the remote endpoint for its incoming label switched path for the local VLAN and storing the label mapping in a database resident in the slave switch.

Figure 5:
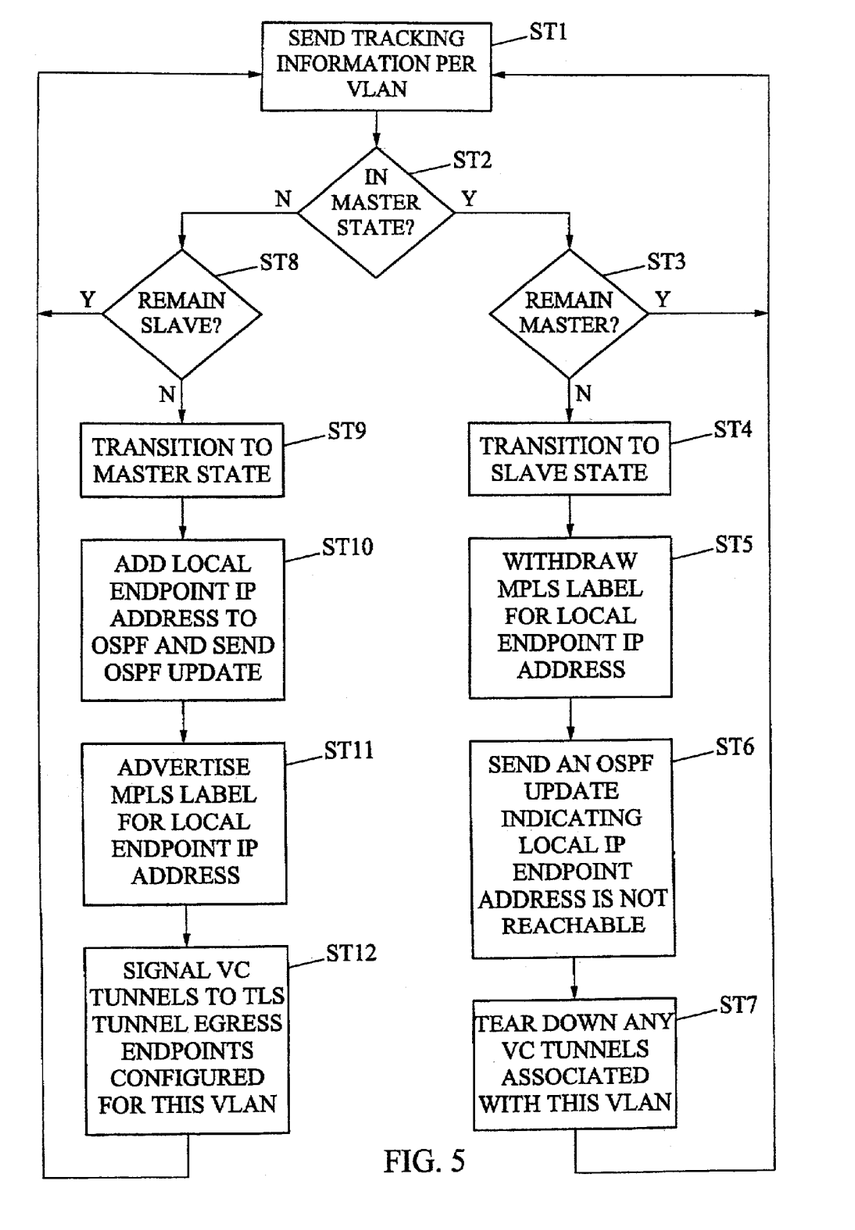
FIG. 5 is a flow chart illustrating exemplary steps that may be performed by a switch in providing redundant connectivity across a network using a tunneling protocol according to an embodiment of the present invention.

FIG. 5 is a flow chart illustrating an exemplary standby routing protocol algorithm executed by a switch, such as master switch 300 or slave switch 302, according to an embodiment of the present invention in transitioning between the master and slave states illustrated in FIG. 4. Referring to FIG. 5, in step ST1, each switch sends connectivity information to the other local switch on a per VLAN basis. As stated above, such connectivity information may include the number of active Ethernet ports for each VLAN and/or the number of label switched paths for a remote endpoint with which the local VLAN desires to communicate. In step ST2, the standby routing protocol algorithm determines whether the switch on which it is executing is in master state. If the switch is in master state, control proceeds to step ST3, where the algorithm determines whether the switch should remain in master state. As discussed above, this decision may be made based on relative connectivity information, such as active ports and/or LSPs on a per VLAN basis. If the algorithm determines that the switch should remain in master state, no state transition occurs and control returns to step ST1. If the algorithm determines that the switch should transition to slave state, in step ST4, the switch transitions to slave state. Upon entering slave state, the switch withdraws MPLS labels for the local endpoint IP address (ST5), sends OSPF update messages to LSRs indicating that the IP address is unreachable (ST6), and tears down any VC tunnels associated with the VLAN (ST7).

Returning to step ST2, if the standby routing protocol algorithm determines that the switch on which the algorithm is executing is in slave state, control proceeds to step ST8, where the algorithm determines whether the switch should remain in slave state. This decision may be made based on relative connectivity information on a per VLAN basis, as discussed above. Another basis for determining whether or not to remain in slave state may be loss of standby routing protocol communications between the master and slave switches. If communications are lost or the relative connectivity of the current switch exceeds that of its companion switch, control the switch transitions to master state (ST9). If the algorithm determines that the switch should remain in slave state, no state transition occurs, and control returns to step ST1.

Upon entering the master state, in step ST10, the switch adds the local endpoint address to its OSPF layer and sends an OSPF update message advertising the IP address to LERs in the MPLS network. This step effectively moves the IP address from the former master switch to the new master switch. In step ST11, the algorithm advertises an MPLS label for the local endpoint IP address in order to set up an LSP for the IP address. In step ST12, the algorithm signals VC tunnels to TLS tunnel egress points configured for this VLAN. This step may be accomplished using targeted LDP. Thus, by continuously monitoring and exchanging relative connectivity information and switching between master and slave states in response to the relative connectivity information, the present invention allows seamless switching of tunnels across a wide area network with minimal disruption to service between endpoint local area networks.

Figure 6:
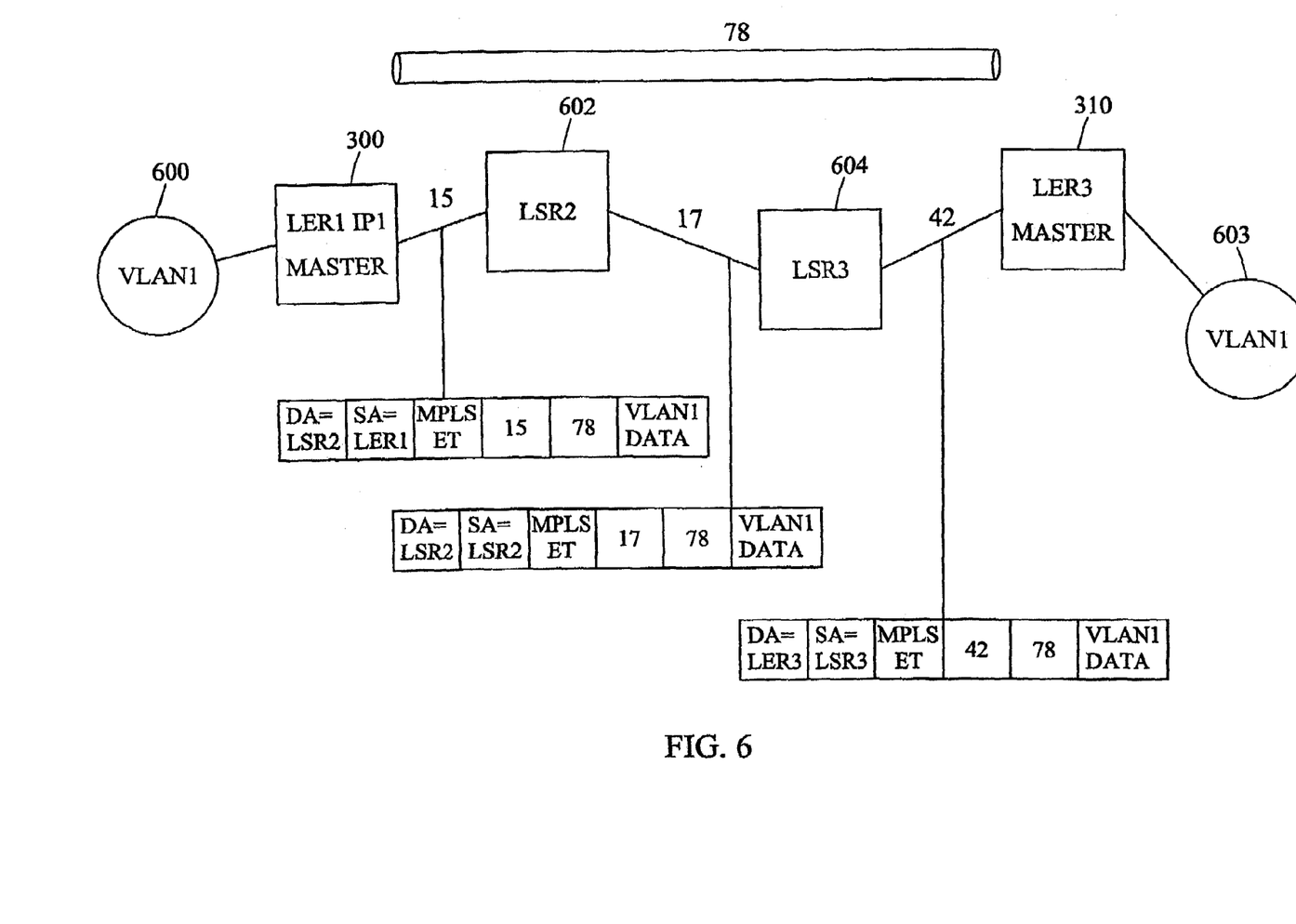
FIG. 6 is a network diagram illustrating exemplary packet structures that may be used to transfer packets between master switches according to an embodiment of the present invention.

FIG. 6 is a network diagram illustrating in more detail an example of transmitting packets between geographically diverse local area networks between master switches according to embodiment of the present invention. In FIG. 6, label master switch 300 advertises the IP address IP1 and the MPLS label 15 to LSR 602. LSR 602 advertises the label 17 to LSR 604. LSR 604 advertises the label 42 to remote master switch 310. This advertisement of labels sets up an outgoing label switched path from master switch 300 to master switch 310. Master switch 310 performs similar operations to set up a reverse label switched path to master switch 300. Master switches 300 and 310 each advertise the VLAN label 78 via targeted LDP to set up a VC tunnel over the underlying label switched paths.

Once the VC tunnel is set up, packets having a two-label stack can be transmitted over the tunnel between master switches 300 and 310. In FIG. 6, the packet structure for each segment is illustrated in block diagram format. For example, packets transmitted from master switch 300 to LSR 602 include a MAC destination address corresponding to LSR 602, a MAC source address corresponding to master switch 300, an MPLS outer label of 15 and an inner label of 78. LSR 602 uses the outer label to determine the next-hop LSR, which in this case is LSR3 604. Accordingly, LSR2 602 swaps the outer label of 15 for the outer label of 17 and forwards the packet to LSR3 604. LSR2 602 does not touch the inner label 78. LSR3 604 replaces the outer label 17 with a new outer label 42 and forwards the packet to master switch 310. Because master switch 310 is the VC tunnel endpoint, master switch 310 pops the outer label and reads the inner label 78. Since the label 78 was established to carry traffic from between instances 600 and 603 of VLAN1, master switch 310 forwards the data to local VLAN instance 603 of VLAN1.

The net result of creating a tunnel and switching packets over the tunnel is that layer 2 data can be transparently transmitted between instances 600 and 603 of VLAN1. Monitoring relative connectivity information and automatically switching between redundant local endpoints based on the relative connectivity information in the manner described above greatly increases the reliability of the connection between remote VLANs.

As stated above, the methods and systems described herein for providing redundant connectivity over a network can be implemented on any suitable switch with layer 2, IP, and MPLS capabilities, such as the BlackDiamond™ gigabit Ethernet switch available from Extreme Networks of Santa Clara, Calif. Physically, such a switch includes a rack with a plurality of card slots. Cards that perform different functions plug into the card slots. The card slots are connected via a high-speed switch fabric. One particular card that is of importance to the present invention is the management switching module (MSM). The MSM includes hardware and software that control the overall operations of other cards within the switch. These functions include the above-described standby routing protocol algorithm for providing redundant connectivity across a network.

Figure 7:
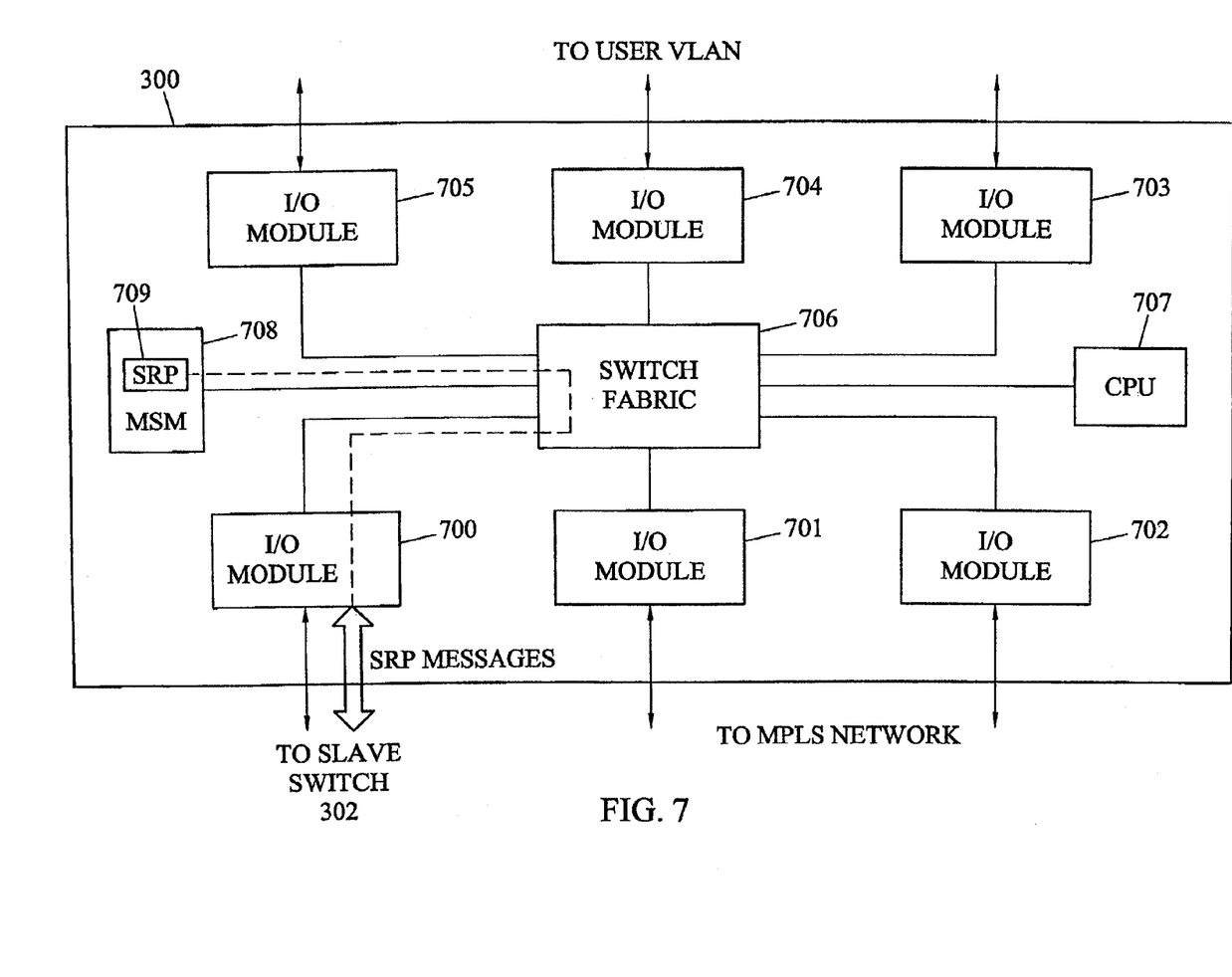
FIG. 7 is a block diagram illustrating an exemplary hardware platform on which the methods and systems for providing redundant connectivity across a network using a tunneling protocol may be implemented.

FIG. 7 illustrates an exemplary hardware platform on which the methods and systems for providing redundant connectivity across a network using a tunneling protocol may be implemented. In FIG. 7, switch 300 includes a plurality of input/output modules 700-705 that provide connectivity to external networks. For example, input/output module 700 may be an Ethernet module that connects switch 300 to switch 302 to carry standby routing protocol messages over an Ethernet. Input/output modules 701 and 702 may also be Ethernet modules that connect switch 300 to the MPLS network. In addition to Ethernet capabilities, input/output modules 701 and 702 may also include MPLS label switching capabilities, VC tunneling capabilities, and LDP label distribution capabilities. Input/output modules 703-705 may connect switch 300 to a user VLAN, such as VLAN1 illustrated in FIG. 4. Accordingly, input/output modules 703-705 may be Ethernet modules with VLAN capabilities.

Modules 700-705 may be interconnected within switch 300 by a switch fabric 706. Switch fabric 706 switches packets received from external networks to the appropriate module or card for processing or routing to a destination network. In one exemplary implementation, switch fabric 706 may be a shared memory switch fabric controlled by a central processing unit 707. Alternatively, switch fabric 706 may be a shared medium switch fabric including one or more high-speed buses.

MSM 708 processes standby routing protocol messages received from switch 302. Accordingly, MSM 708 includes a standby routing protocol module 709 for implementing the standby routing protocol algorithm described above with respect to FIGS. 4 and 5. MSM 708 may also perform operations administration and maintenance functions, which are not of importance to explaining the present invention.

In operation, when switch 300 receives an SRP message from switch 302, the SRP message arrives via an Ethernet frame to input/output module 700. Input/output module 700 forwards the SRP message to switch fabric 706. Switch fabric 706 determines that the appropriate destination for the SRP message is MSM 708. Accordingly, switch fabric 706 forwards the SRP message to MSM 708. MSM 708 receives the SRP message and SRP module 709 processes the message. For example, SRP module 709 may extract connectivity information from the message and compare the connectivity information to the connectivity information of switch 300. The connectivity information of switch 300 may be stored in memory on MSM 708. Alternatively, MSM 708 may poll input/output modules 701-705 to determine the relative connectivity information. If SRP module 709 determines that a change in state is required, SRP module 709 may instruct the appropriate input/output modules to perform the functions required for changing states. For example, if SRP module 709 determines that switch 300 should switch from master state to slave state, SRP module 709 may instruct input/output modules 701 and 702 to advertise a route of unreachable to the movable IP address and withdraw labels associated with the outgoing LSP and the VC tunnel. SRP module 709 may also forward connectivity information regarding switch 300 to switch 302 via input/output module 700.

Thus, the present invention provides redundant connectivity between remote networks using a tunneling protocol. According to the invention, master and slave switches are provided at tunnel endpoints. The master switch at each tunnel endpoint establishes incoming and outgoing LSPs and a bi-directional tunnel with the master switch at the other tunnel endpoint. The slave switch at each tunnel endpoint generates an outgoing LSP with the master switch associated with the other tunnel endpoint. The master and slave switches at each tunnel endpoint exchange relative connectivity information. Based on the relative connectivity information, the master and slave switches dynamically move an IP address between each other. When the slave switch transitions to the master state, the new master switch establishes a tunnel with the master switch associated with the remote tunnel endpoint. Bi-directional communications can then occur over the new tunnel with minimal service interruption between remote VLANs.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for providing redundant connectivity between remote networks using a tunneling protocol, the method comprising:

(a) providing a first switch in a master state and a second switch in a slave state between a first network and an intermediate network;

(b) providing a third switch in the master state and a fourth switch in the slave state between a second network and the intermediate network;

(c) from the first switch, advertising a route to a movable IP address associating the movable IP address with an interface on the first switch;

(d) establishing incoming and outgoing paths and a tunnel over the paths between the first and third switches using the movable IP address as a tunnel endpoint and forwarding traffic between the first and second networks over the tunnel;

(e) at the second switch, establishing an outgoing path with the third switch;

(f) monitoring relative connectivity between the first network and the intermediate network provided by the first and second switches; and (g) in response to detecting that the connectivity of the second switch exceeds that of the first switch, dynamically transitioning the first switch to the slave state and the second switch to the master state, wherein transitioning the second switch to the master state includes associating the movable IP address with an interface on the second switch and establishing an incoming path and a tunnel with the third switch using the movable IP address as an endpoint, wherein monitoring relative connectivity includes monitoring relative connectivity on per VLAN basis.

2. The method of claim 1 wherein providing a first and second switches includes providing first and second Ethernet switches as ingress points to an MPLS network.

3. The method of claim 1 wherein advertising a route for the movable IP address includes advertising the route via the open shortest path first (OSPF) protocol.

4. The method of claim 1 wherein establishing a tunnel between the first and third switches includes establishing a virtual circuit tunnel between the first and third switches.

5. The method of claim 1 wherein establishing a tunnel between the first and third switches includes establishing a transparent LAN services (TLS) tunnel between the first and third switches.

6. The method of claim 1 wherein forwarding traffic over the tunnel includes forwarding VLAN traffic over the tunnel.

7. A method for providing redundant connectivity between remote networks using a tunneling protocol, the method comprising:

(a) providing a first switch in a master state and a second switch in a slave state between a first network and an intermediate network;

(b) providing a third switch in the master state and a fourth switch in the slave state between a second network and the intermediate network;

(c) from the first switch, advertising a route to a movable IP address associating the movable IP address with an interface on the first switch;

(d) establishing incoming and outgoing paths and a tunnel over the paths between the first and third switches using the movable IP address as a tunnel endpoint and forwarding traffic between the first and second networks over the tunnel;

(e) at the second switch, establishing an outgoing path with the third switch;

(f) monitoring relative connectivity between the first network and the intermediate network provided by the first and second switches; and (g) in response to detecting that the connectivity of the second switch exceeds that of the first switch, dynamically transitioning the first switch to the slave state and the second switch to the master state, wherein transitioning the second switch to the master state includes associating the movable IP address with an interface on the second switch and establishing an incoming oath and a tunnel with the third switch using the movable IP address as an endpoint, wherein monitoring relative connectivity comprises monitoring the relative number of label switched paths between the first and second switches and remote IP addresses.

8. A method for providing redundant connectivity between remote networks using a tunneling protocol, the method comprising:
  (a) providing a first switch in a master state and a second switch in a slave state between a first network and an intermediate network;
  (b) providing a third switch in the master state and a fourth switch in the slave state between a second network and the intermediate network;
  (c) from the first switch, advertising a route to a movable IP address associating the movable IP address with an interface on the first switch;
  (d) establishing incoming and outgoing paths and a tunnel over the paths between the first and third switches using the movable IP address as a tunnel endpoint and forwarding traffic between the first and second networks over the tunnel;
  (e) at the second switch, establishing an outgoing path with the third switch;
  (f) monitoring relative connectivity between the first network and the intermediate network provided by the first and second switches; and
  (g) in response to detecting that the connectivity of the second switch exceeds that of the first switch, dynamically transitioning the first switch to the slave state and the second switch to the master state, wherein transitioning the second switch to the master state includes associating the movable IP address with an interface on the second switch and establishing an incoming path and a tunnel with the third switch using the movable IP address as an endpoint, wherein monitoring relative connectivity comprises monitoring the relative number of open Ethernet ports provided by the first and second switches to the first network.

9. A method for providing redundant connectivity between remote networks using a tunneling protocol, the method comprising:
  (a) providing a first switch in a master state and a second switch in a slave state between a first network and an intermediate network;
  (b) providing a third switch in the master state and a fourth switch in the slave state between a second network and the intermediate network;
  (c) from the first switch, advertising a route to a movable IP address associating the movable IP address with an interface on the first switch;
  (d) establishing incoming and outgoing paths and a tunnel over the paths between the first and third switches using the movable IP address as a tunnel endpoint and forwarding traffic between the first and second networks over the tunnel;
  (e) at the second switch, establishing an outgoing oath with the third switch;
  (f) monitoring relative connectivity between the first network and the intermediate network provided by the first and second switches; and
  (g) in response to detecting that the connectivity of the second switch exceeds that of the first switch, dynamically transitioning the first switch to the slave state and the second switch to the master state, wherein transitioning the second switch to the master state includes associating the movable IP address with an interface on the second switch and establishing an incoming path and a tunnel with the third switch using the movable IP address as an endpoint and where the method further comprises, in response to detecting that connectivity of the second switch exceeds that of the first switch, advertising a route of unreachable to the movable IP address and withdrawing labels associated with the incoming path and the tunnel.

10. The method of claim 1 wherein the first and second networks comprise virtual local area networks (VLANs).

11. The method of claim 1 wherein establishing incoming and outgoing paths comprises establishing incoming and outgoing MPLS label switched paths.

12. The method of claim 1 wherein establishing incoming and outgoing paths comprises establishing incoming and outgoing generic route encapsulation (GRE) paths.

13. A system for providing redundant connectivity across a network, the system comprising:
  (a) a first switch configured to operate in a master state wherein the first switch advertises a route to a movable local endpoint IP address to routers in an intermediate network and establishes incoming and outgoing paths and a tunnel for carrying local network traffic over the intermediate network;
  (b) a second switch configured to operate in a slave state wherein the second switch establishes a redundant outgoing path across the intermediate network; and
  (c) standby routing protocol software for executing on the first and second switches for monitoring relative connectivity provided by the switches and dynamically switching the first switch to operate in the slave state and the second switch to operate in the master state in response to detecting that the relative connectivity of the second switch exceeds that of the first switch, wherein the standby routing protocol software counts the relative number of operational ports that each of the first and second switches has with the local network and to move the local endpoint IP address between the first and second switches based on the relative number of operational ports.

14. The system of claims 13 wherein the first and second switches comprise Ethernet switches.

15. A system for providing redundant connectivity across a network, the system comprising:
  (a) a first switch configured to operate in a master state wherein the first switch advertises a route to a movable local endpoint IP address to routers in an intermediate network and establishes incoming and outgoing paths and a tunnel for carrying local network traffic over the intermediate network;
  (b) a second switch configured to operate in a slave state wherein the second switch establishes a redundant outgoing path across the intermediate network; and
  (c) standby routing protocol software for executing to execute on the first and second switches for monitoring relative connectivity provided by the switches and dynamically switching the first switch to operate in the slave state and the second switch to operate in the master state in response to detecting that the relative connectivity of the second switch exceeds that of the first switch, wherein the standby routing protocol software counts the relative number of label switched paths that each of the first and second switches has with a remote IP address across the intermediate network and to move the local endpoint IP address between the first and second switches based on the relative number of label switched paths.

16. The system of claim 13 wherein the incoming and outgoing paths comprise MPLS label switched paths.

17. The system of claim 13 wherein the incoming and outgoing paths comprise generic route encapsulation (GRE) paths.

18. A switch for tunneling traffic across a network, the switch comprising:
  (a) a first input/output module for receiving traffic from a first network;
  (b) a second input/output module for tunneling traffic received from the first network to a second network across an intermediate network;
  (c) a third input/output module for receiving connectivity information from a companion switch; and
  (d) a standby routing protocol module operatively associated with the input/output modules, for monitoring connectivity information provided by the companion switch and dynamically establishing and tearing down tunnels with the second network based on the connectivity information,
  wherein the standby routing protocol module monitors connectivity provided by the first and second input/output modules to the first network and compare the connectivity provided by the first and second input/output modules with the connectivity information received from the companion switch.

19. The switch of claim 18 wherein the input/output modules comprise Ethernet modules.

20. The switch of claim 18 wherein the first input/output module is adapted to receive traffic from a VLAN.

21. The switch of claim 18 wherein the second input/output module is adapted to tunnel traffic over an MPLS network.

22. The switch of claim 18 wherein the second input/output module is adapted to tunnel layer 2 traffic over the MPLS network.

23. The switch of claim 22 wherein the second input/output module is adapted to tunnel the layer 2 traffic over the MPLS network using VC tunnels over MPLS label switched paths.

24. The switch of claim 18 wherein the standby routing protocol module is adapted to move an Internet protocol address from a tunnel associated with the second input/output module to the companion switch in response to determining that connectivity provided by the first and second input/output modules is less than that provided by the companion switch.

25. A switch for tunneling traffic across a network, the switch comprising:
  (a) a first input/output module for receiving traffic from a first network;
  (b) a second input/output module for tunneling traffic received from the first network to a second network across an intermediate network;
  (c) a third input/output module for receiving connectivity information from a companion switch; and
  (d) a standby routing protocol module operatively associated with the input/output modules, for monitoring connectivity information provided by the companion switch and dynamically establishing and tearing down tunnels with the second network based on the connectivity information, wherein the standby routing protocol module operates the first and second input/output modules in a master state when connectivity provided by the first and second input/output modules exceeds that provided by the companion switch.

26. A switch for tunneling traffic across a network, the switch comprising:
  (a) a first input/output module for receiving traffic from a first network;
  (b) a second input/output module for tunneling traffic received from the first network to a second network across an intermediate network;
  (c) a third input/output module for receiving connectivity information from a companion switch; and
  (d) a standby routing protocol module operatively associated with the input/output modules, for monitoring connectivity information provided by the companion switch and dynamically establishing and tearing down tunnels with the second network based on the connectivity information, wherein the standby routing protocol module is adapted to operate the first and second input/output modules in a slave state when connectivity provided by the first and second input/output modules is less than that of the companion switch.

27. A computer readable medium comprising computer executable instructions for performing. steps comprising:
  (a) tunneling layer 2 traffic from a first switch across a network to a remote endpoint;
  (b) comparing connectivity to the remote endpoint provided by the first switch with connectivity to the remote endpoint provided by a second switch; and
  (c) in response to determining that connectivity of the second switch exceeds that of the first switch, ceasing the tunneling of layer 2 traffic from the first switch and initiating tunneling of the layer 2 traffic from the second switch, wherein comparing connectivity includes comparing the number of label switched paths provided by the first and second switches to a configured set of remote IP address endpoints.

28. The computer program product of claim 27 wherein tunneling layer 2 traffic includes tunneling layer 2 traffic using virtual circuit (VC) tunnel running over MPLS label switched paths.

29. The computer program product of claim 27 wherein tunneling layer 2 traffic includes tunneling VLAN traffic across the network.

30. A computer readable medium comprising computer executable instructions for performing. steps comprising:
  (a) tunneling layer 2 traffic from a first switch across a network to a remote endpoint;
  (b) comparing connectivity to the remote endpoint provided by the first switch with connectivity to the remote endpoint provided by a second switch; and
  (c) in response to determining that connectivity of the second switch exceeds that of the first switch, ceasing the tunneling of layer 2 traffic from the first switch and initiating tunneling of the layer 2 traffic from the second switch, wherein comparing connectivity includes comparing the number of active Ethernet interfaces provided by the first and second switches to a source network.

31. The computer program product of claim 27 comprising, in response to detecting that the connectivity of the second switch exceeds that of the first switch, tearing down tunnels between the first switch and the remote endpoint and establishing tunnels between the second switch and remote.

32. The computer program product of claim 27 comprising, in response to detecting that the connectivity of the second switch exceeds that of the first switch, moving an IP address from the first switch to the second switch.

33. A computer readable medium comprising computer executable instructions from performing steps comprising:
   (a) tunneling layer 2 traffic from a first switch across a network to a remote endpoint;
   (b) comparing connectivity to the remote endpoint provided by the first switch with connectivity to the remote endpoint provided by a second switch; and
   (c) in response to determining that connectivity of the second switch exceeds that of the first switch, ceasing the tunneling of layer 2 traffic from the first switch and initiating tunneling of the layer 2 traffic from the second switch, moving an IP address from the first switch to the second switch, wherein moving an IP address from the first switch to the second switch includes advertising a route of unreachable with regard to the IP address from the first switch and advertising a route with a finite cost for the IP address from the second switch.

* * * * *